US012662123B2

(12) United States Patent
    Pfau

(10) Patent No.: US 12,662,123 B2
(45) Date of Patent: Jun. 23, 2026

(54) CONTROL DEVICE AND CONTROL METHOD OF RIDER ASSISTANCE SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 18/710,667

(22) PCT Filed: Nov. 30, 2022

(86) PCT No.: PCT/IB2022/061587
    § 371 (c)(1),
    (2) Date: May 16, 2024

(87) PCT Pub. No.: WO2023/105351
    PCT Pub. Date: Jun. 15, 2023

(65) Prior Publication Data
    US 2025/0050882 A1     Feb. 13, 2025

(30) Foreign Application Priority Data

Dec. 7, 2021    (JP) .................................. 2021-198444

(51) Int. Cl.
    B60W 30/16        (2020.01)
    B60W 30/02        (2012.01)
    (Continued)

(52) U.S. Cl.
    CPC ............ B60W 30/16 (2013.01); B60W 30/02 (2013.01); B60W 30/143 (2013.01);
    (Continued)

(58) Field of Classification Search
    CPC .... B60W 30/16; B60W 30/02; B60W 30/143; B60W 50/14; B60W 2050/0083;
    (Continued)

(56) References Cited

U.S. PATENT DOCUMENTS 10,882,523 B2 *   1/2021   Knitt ...................... B60W 30/16
2014/0309836 A1 *  10/2014   Ollis ..................... B60W 30/00
                                                          701/25

(Continued)

FOREIGN PATENT DOCUMENTS

DE      102018122588 A1    3/2019
DE      102019214121 A1    3/2021

(Continued)

OTHER PUBLICATIONS

JP_2021076886_A_I_translation (Year: 2021).*

(Continued)

*Primary Examiner* — Kyle T Johnson
(74) *Attorney, Agent, or Firm* — Michael Best & Friedrich LLP

(57)                ABSTRACT

The invention is to obtain a control device and a control method capable of assisting group driving of a motorcycle. A control device of a rider assistance system includes a vehicle speed control execution section executing a vehicle speed control operation of an own-vehicle (100), on the basis of positional relationship information between the own-vehicle (100) and at least one preceding vehicle (300) that is acquired while the own-vehicle (100) is driving, and an alignment operation execution section executing an alignment operation of aligning at least a part of an array that is formed by at least three motorcycles (200), in the vehicle speed control operation in a state in which a group driving mode that is a mode in which the at least three motorcycles (200) including the own-vehicle (100) perform group driving is valid.

15 Claims, 5 Drawing Sheets

(51) Int. Cl.

| | |
|---|---|
| *B60W 30/14* | (2006.01) |
| *B60W 50/00* | (2006.01) |
| *B60W 50/14* | (2020.01) |

(52) U.S. Cl.
   CPC ..... *B60W 50/14* (2013.01); *B60W 2050/0083*
      (2013.01); *B60W 2050/146* (2013.01); *B60W*
      *2300/36* (2013.01); *B60W 2554/802* (2020.02)

(58) Field of Classification Search
   CPC ....... B60W 2050/146; B60W 2300/36; B60W
      2554/802; B60W 2554/801; B60W
      30/165; B60Y 2200/12
   See application file for complete search history.

(56) References Cited

U.S. PATENT DOCUMENTS

| | | | | |
|---|---|---|---|---|
| 2019/0086914 | A1* | 3/2019 | Yen | H04L 67/1046 |
| 2019/0122563 | A1* | 4/2019 | Wahl | H04W 4/38 |
| 2019/0248367 | A1* | 8/2019 | Knitt | B60W 10/184 |
| 2020/0211553 | A1* | 7/2020 | Bohl | G10L 15/26 |
| 2021/0316735 | A1* | 10/2021 | Park | B60W 10/08 |
| 2022/0261010 | A1* | 8/2022 | Ji | G05D 1/0291 |
| 2023/0373482 | A1* | 11/2023 | Schoenherr | B60W 40/06 |
| 2024/0075926 | A1* | 3/2024 | Igari | B60W 30/16 |
| 2024/0169842 | A1* | 5/2024 | Moriarty | B62J 50/22 |
| 2024/0208598 | A1* | 6/2024 | Pfau | B60W 30/16 |
| 2025/0050882 | A1* | 2/2025 | Pfau | B60W 30/16 |
| 2025/0074408 | A1* | 3/2025 | Katayama | B60W 30/0956 |
| 2025/0108824 | A1* | 4/2025 | Yoshinaga | B60W 50/14 |
| 2025/0214584 | A1* | 7/2025 | Moldovan | B60W 30/14 |
| 2025/0242810 | A1* | 7/2025 | Pfau | B60W 30/165 |

FOREIGN PATENT DOCUMENTS

| | | | | | |
|---|---|---|---|---|---|
| DE | 102021211214 | A1 | * | 4/2023 | ......... B60W 50/082 |
| EP | 3276443 | A1 | * | 1/2018 | ......... B60W 50/082 |
| EP | 3335953 | A1 | | 6/2018 | |
| JP | 2019137392 | A | | 8/2019 | |
| JP | 2021076886 | A | * | 5/2021 | |
| KR | 20200026558 | A | * | 3/2020 | .......... G06Q 10/083 |
| WO | 2018197965 | A1 | | 11/2018 | |
| WO | 2020202266 | A1 | | 10/2020 | |
| WO | 2020202283 | A1 | | 10/2020 | |
| WO | WO-2021235043 | A1 | * | 11/2021 | .............. G08G 1/16 |
| WO | WO-2023012653 | A1 | * | 2/2023 | ............ B60K 35/22 |
| WO | WO-2023053225 | A1 | * | 4/2023 | ........... B60T 8/1706 |
| WO | WO-2024147051 | A1 | * | 7/2024 | ............ G08G 1/166 |

OTHER PUBLICATIONS

WO_2021235043_A1_I_translation (Year: 2021).*
WO_2023012653_A1_I_translation (Year: 2023).*
WO_2023053225_A1_I_translation (Year: 2023).*
WO_2024147051_A1_I_translation (Year: 2024).*
DE-102021211214-A1 translation (Year: 2023).*
KR-20200026558-A translation (Year: 2020).*
A_study_on_applicable_control_methods_of_electric_power_steering_
system (Year: 2018).*
International Search Report and Written Opinion for Application
No. PCT/IB2022/061587 dated Mar. 2, 2023 (8 pages).

* cited by examiner

[FIG. 1]
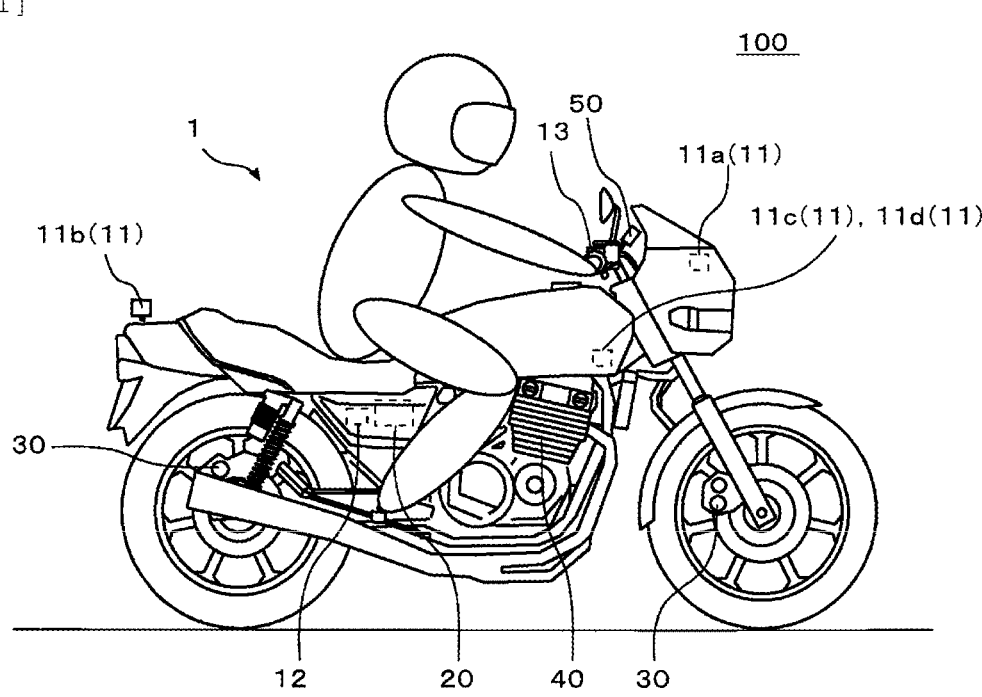
[FIG. 2]
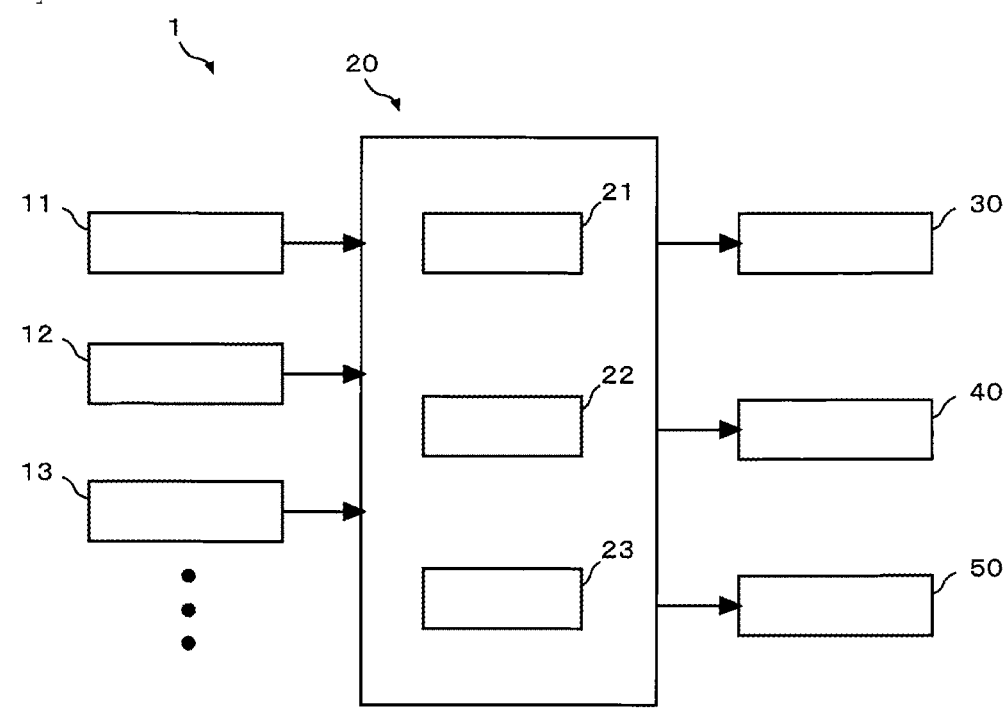

[FIG. 3]
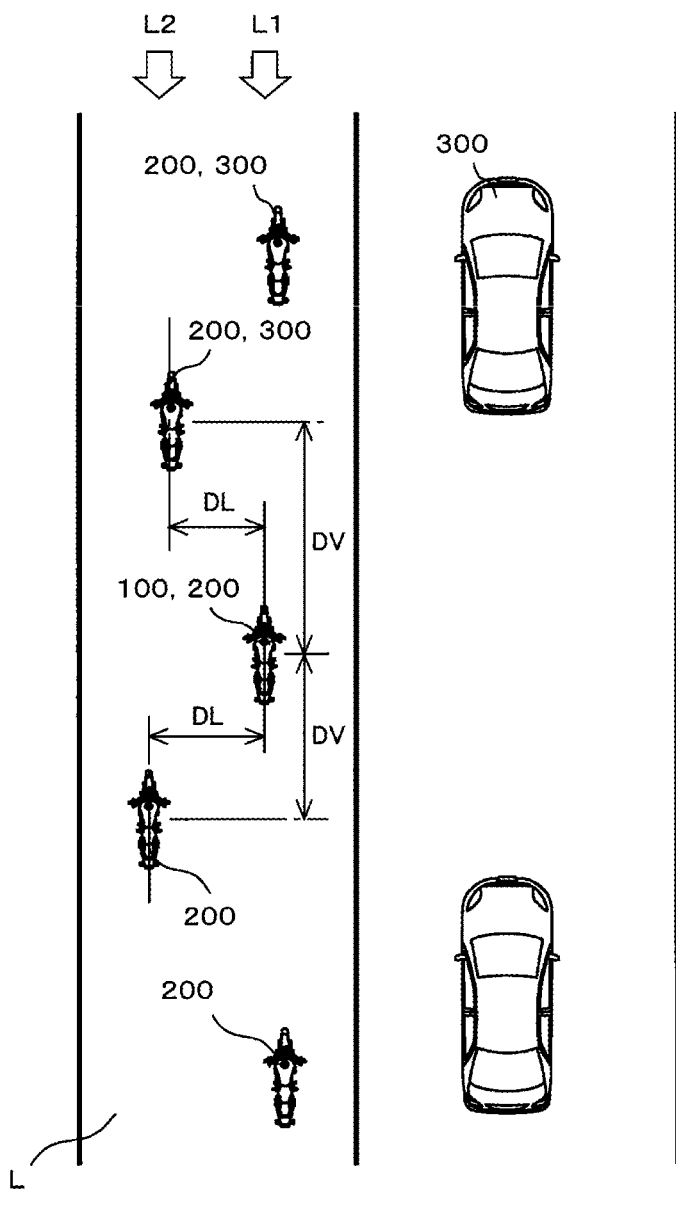

[FIG. 4]
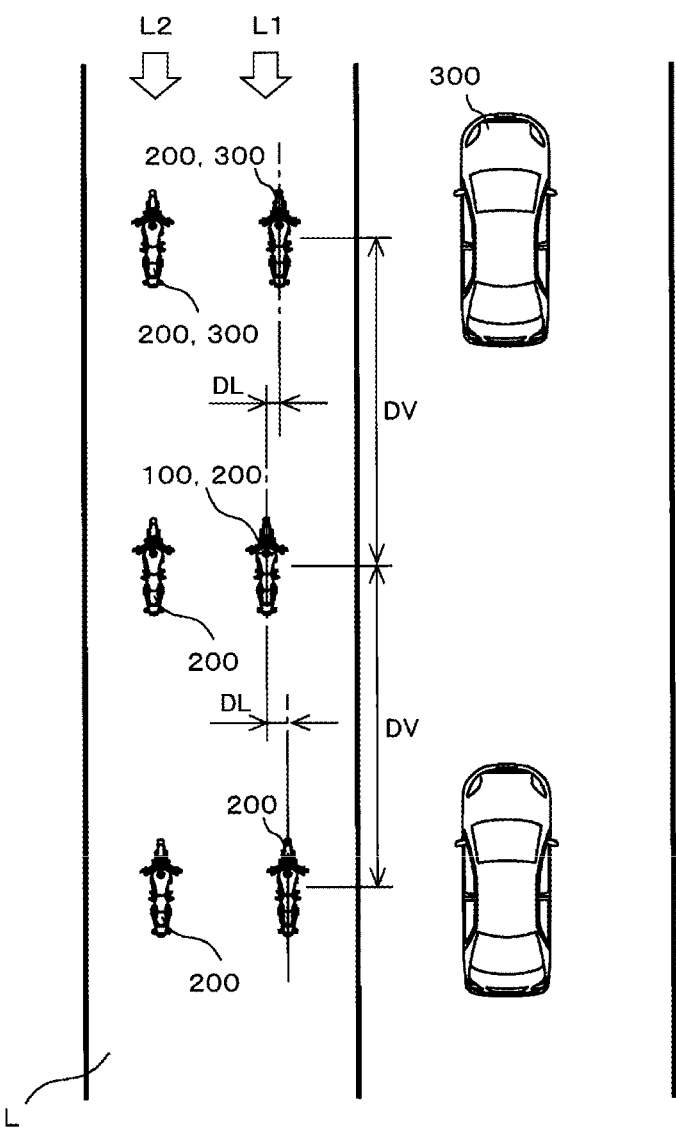

[FIG. 5]
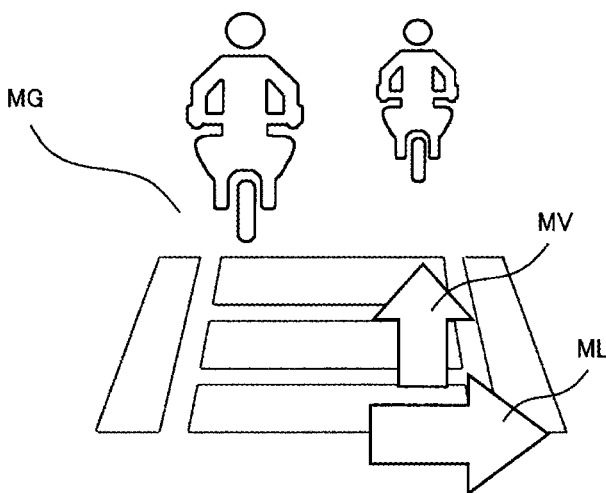
[FIG. 6]
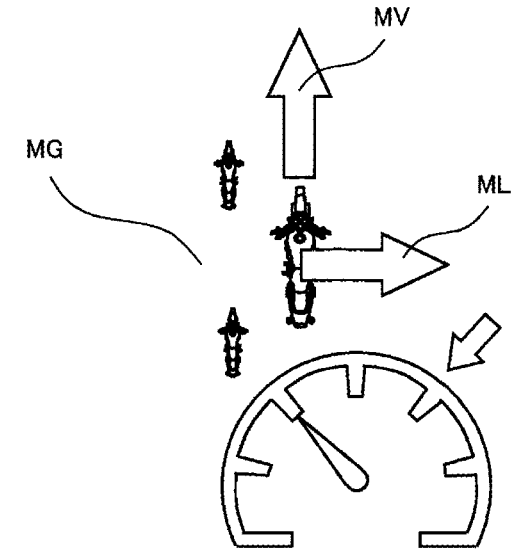
[FIG. 7]
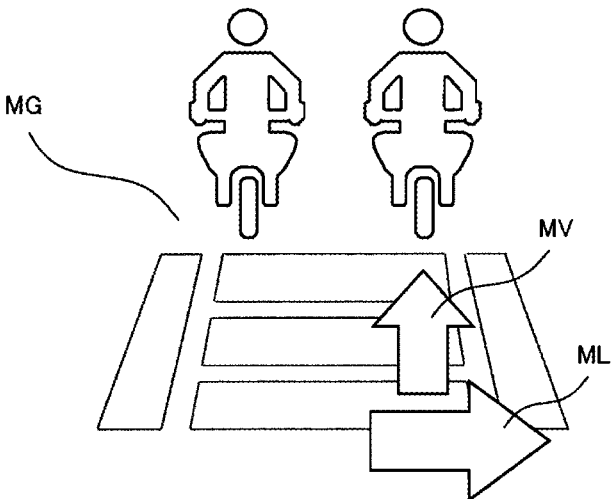

[FIG. 8]
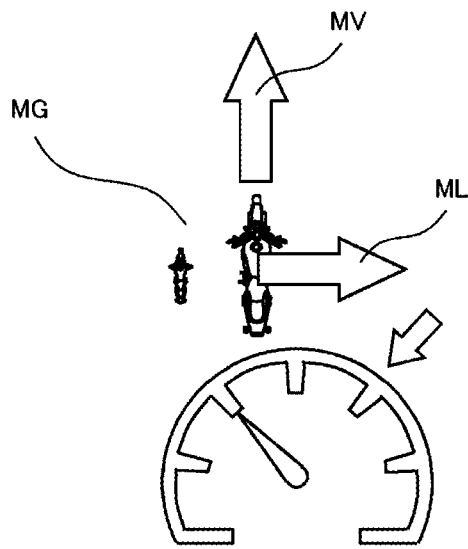
[FIG. 9]
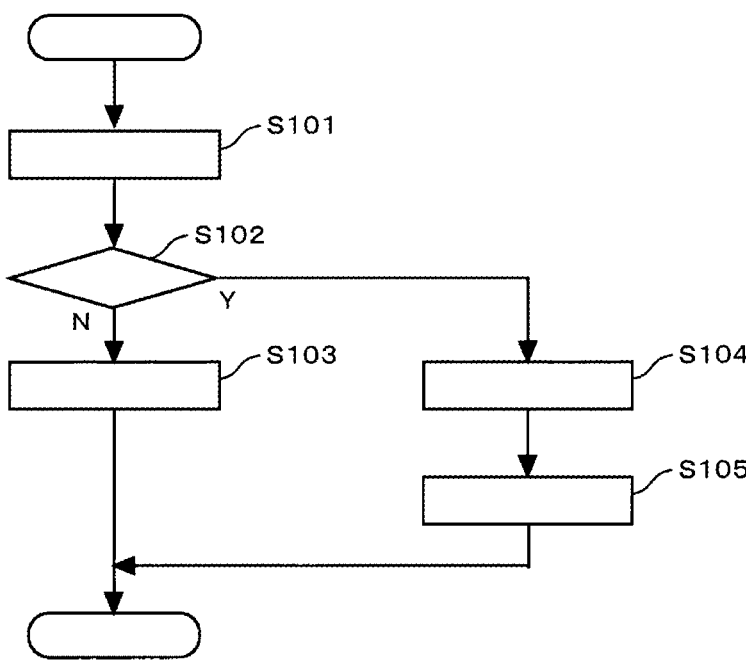

CONTROL DEVICE AND CONTROL METHOD OF RIDER ASSISTANCE SYSTEM

BACKGROUND

The invention relates to a control device of a rider assistance system of a motorcycle, and a control method of a rider assistance system of a motorcycle.

As a rider assistance system of the related art, a control device executes a vehicle speed control operation of an own-vehicle, on the basis of positional relationship information between the own-vehicle and at least one preceding vehicle that is acquired while the own-vehicle is driving (for example, refer to WO2018/197965A1).

SUMMARY

In the rider assistance system, a case is assumed in which the vehicle speed control operation of the own-vehicle is executed in a state where a group driving mode that is a mode in which at least three motorcycles including the own-vehicle perform group driving is valid. In such a case, it is desirable that an array is formed in which the motorcycles are orderly arranged. Since the motorcycle has a small vehicle body size unlike other vehicles (for example, a passenger car, a cargo truck, and the like) and has a high degree of freedom in a driving position, it is particularly desirable to assist the formation of such an array.

The invention has been made in the background of the problems described above, and is to obtain a control device capable of assisting group driving of a motorcycle. In addition, the invention is to obtain a control method capable of assisting group driving of a motorcycle.

A control device according to the invention is a control device of a rider assistance system including a vehicle speed control execution section executing a vehicle speed control operation of an own-vehicle, on the basis of positional relationship information between the own-vehicle and at least one preceding vehicle that is acquired while the own-vehicle is driving, and an alignment operation execution section executing an alignment operation of aligning at least a part of an array that is formed by at least three motorcycles, in the vehicle speed control operation in a state in which a group driving mode that is a mode in which the at least three motorcycles including the own-vehicle perform group driving is valid.

In a control method according to the invention, a vehicle speed control execution section of a control device executes a vehicle speed control operation of an own-vehicle, on the basis of positional relationship information between the own-vehicle and at least one preceding vehicle that is acquired while the own-vehicle is driving, and an alignment operation execution section of the control device executes an alignment operation of aligning at least a part of an array that is formed by at least three motorcycles, in the vehicle speed control operation in a state in which a group driving mode that is a mode in which the at least three motorcycles including the own-vehicle perform group driving is valid.

In the control device and the control method according to the invention, the vehicle speed control execution section executes the vehicle speed control operation of the own-vehicle, on the basis of the positional relationship information between the own-vehicle and the at least one preceding vehicle that is acquired while the own-vehicle is driving, and the alignment operation execution section executes the alignment operation of aligning at least a part of the array that is formed by the at least three motorcycles, in the vehicle speed control operation in a state where the group driving mode is valid. Accordingly, it is possible to suitably assist group driving of a specific vehicle such as a motorcycle.

BRIEF DESCRIPTION OF DRAWINGS

FIG. 1 is a diagram illustrating a state in which a rider assistance system according to an embodiment of the invention is mounted to a motorcycle.

FIG. 2 is a diagram illustrating a system configuration of the rider assistance system according to the embodiment of the invention.

FIG. 3 is a diagram for illustrating a configuration of the rider assistance system according to the embodiment of the invention.

FIG. 4 is a diagram for illustrating the configuration of the rider assistance system according to the embodiment of the invention.

FIG. 5 is a diagram for illustrating the configuration of the rider assistance system according to the embodiment of the invention.

FIG. 6 is a diagram for illustrating the configuration of the rider assistance system according to the embodiment of the invention.

FIG. 7 is a diagram for illustrating the configuration of the rider assistance system according to the embodiment of the invention.

FIG. 8 is a diagram for illustrating the configuration of the rider assistance system according to the embodiment of the invention.

FIG. 9 is a diagram illustrating an operation flow of a control device of the rider assistance system according to the embodiment of the invention.

DETAILED DESCRIPTION

Hereinafter, a control device and a control method according to the invention will be described by using the drawings.

Note that, the following configurations, operations, and the like are an example, and the control device and the control method according to the invention are not limited to the following configurations, operations, and the like.

For example, hereinafter, a case will be described in which the control device and the control method according to the invention are used in a rider assistance system of a motor bicycle, but the control device and the control method according to the invention may be used in a rider assistance system of a motorcycle other than the motor bicycle. The motorcycle includes a vehicle using an engine as a power source, a vehicle using an electric motor as a power source, and the like. The motorcycle, for example, includes a motor tricycle, a motorbike, a scooter, an electric scooter, and the like of which the vehicle body falls toward the right side when performing turning driving to a right direction and the vehicle body falls toward the left side when performing turning driving to a left direction.

In addition, hereinafter, the same or similar description will be suitably simplified or omitted. In addition, in each of the drawings, the same reference numerals will be applied to the same or similar parts, or will be omitted. In addition, the illustration of a detailed structure will be suitably simplified or omitted.

Hereinafter, a rider assistance system according to an embodiment will be described.

<Configuration of Rider Assistance System>

The configuration of the rider assistance system according to the embodiment will be described.

FIG. 1 is a diagram illustrating a state in which the rider assistance system according to the embodiment of the invention is mounted to a motorcycle. FIG. 2 is a diagram illustrating a system configuration of the rider assistance system according to the embodiment of the invention. FIG. 3 to FIG. 8 are diagrams illustrating the configuration of the rider assistance system according to the embodiment of the invention.

As illustrated in FIG. 1 and FIG. 2, a rider assistance system 1 is mounted to a motorcycle 100. The rider assistance system 1, for example, includes a surrounding environment sensor 11, a vehicle behavior sensor 12, a setting input device 13, a control device (ECU) 20, a braking device 30, a driving device 40, and a notification device 50. The motorcycle 100 corresponds to an "own-vehicle" of the invention.

In the rider assistance system 1, the control device 20 executes a rider assistance operation of assisting the driving of the motorcycle 100 by a rider, using the output of the surrounding environment sensor 11 and the vehicle behavior sensor 12, and the output of the setting input device 13. The control device 20 outputs a control command to various devices (for example, the braking device 30, the driving device 40, the notification device 50, and the like), and executes the rider assistance operation. The control device 20, as necessary, receives the output of various sensors (not illustrated) for detecting other information (for example, information on a manipulation state of the braking device 30 by the rider, information on a manipulation state of the driving device 40 by the rider, or the like). Each unit of the rider assistance system 1 may be used exclusively for the rider assistance system 1, or may be shared with other systems.

The surrounding environment sensor 11 includes at least a detection unit 11*a* detecting the surrounding environment in front of the motorcycle 100. The surrounding environment sensor 11 may include a detection unit 11*b* detecting the surrounding environment at the rear of the motorcycle 100, may include a detection unit 11*c* detecting the surrounding environment on the left side of the motorcycle 100, or may include a detection unit 11*d* detecting the surrounding environment on the right side of the motorcycle 100. Each of the detection units 11*a*, 11*b*, 11*c*, and 11*d*, for example, is a radar, a Lidar sensor, an ultrasonic sensor, a camera, or the like. At least a part of the detection unit 11*c* and the detection unit 11*d* may be used instead of the detection unit 11*a* or the detection unit 11*b*.

The vehicle behavior sensor 12, for example, is a vehicle speed sensor, an inertia sensor (IMU), or the like. The vehicle speed sensor detects a speed caused in the motorcycle 100. The vehicle speed sensor may detect other physical amounts that can be substantially converted into the speed caused in the motorcycle 100. The inertia sensor detects triaxial (a front-back direction, a vehicle-width direction, and a vehicle-height direction) acceleration and a triaxial (roll, pitch, and yaw) angular rate caused in the motorcycle 100. The inertia sensor may detect other physical amounts that can be substantially converted into the triaxial acceleration and the triaxial angular rate caused in the motorcycle 100. In addition, the inertia sensor may detect only a part of the triaxial acceleration and the triaxial angular rate.

The setting input device 13 receives the input of various settings by the rider. For example, the rider is capable of switching the validity and invalidity of various rider assistance operations by using the setting input device 13. In addition, for example, the rider is capable of setting various modes or various threshold values (for example, an upper limit value, a lower limit value, and the like) to be used in various rider assistance operations by using the setting input device 13. The setting input device 13 may receive the manipulation of the body of the rider (for example, hands, feet, and the like), or may receive the voice of the rider. In addition, the setting input device 13 may be provided to the motorcycle 100, or may be provided to an appurtenance attached to the motorcycle 100 (for example, a helmet, gloves, and the like).

The control device 20 includes at least an acquisition section 21, a vehicle speed control execution section 22, and an alignment operation execution section 23. All or each of the sections of the control device 20 may be collectively provided to one housing, or may be dividedly provided to a plurality of housings. In addition, all or each of the sections of the control device 20, for example, may include a microcomputer, a microprocessor unit, or the like, may include updatable firmware, or may be a program module or the like that is executed by a command from a CPU or the like.

The acquisition section 21 acquires surrounding environment information on the motorcycle 100, on the basis of the output of the surrounding environment sensor 11, while the motorcycle 100 is driving. The surrounding environment information includes positional relationship information between the motorcycle 100 and a target positioned around the motorcycle 100 (for example, a vehicle, an obstacle, a road facility, a person, an animal, and the like). The positional relationship information, for example, is information such as a relative position, a relative distance, a relative speed, relative acceleration, relative jerk, a transit time difference, and a predicted time to crackup. The positional relationship information may be information on other physical amounts that can be substantially converted into the above information.

The vehicle speed control execution section 22 executes a vehicle speed control operation of the motorcycle 100 as the rider assistance operation, on the basis of the positional relationship information that is acquired by the acquisition section 21. When executing the vehicle speed control operation, the vehicle speed control execution section 22 outputs the control command to the braking device 30 or the driving device 40. The braking device 30 brakes the motorcycle 100. The driving device 40 drives the motorcycle 100 as a power source of the motorcycle 100. The braking device 30 may be controlled to cause or increase deceleration, or may be controlled to cause or increase acceleration. The driving device 40 may be controlled to cause or increase acceleration, or may be controlled to cause or increase deceleration. In some cases, the braking device 30 and the driving device 40 are provided to a vehicle different from the motorcycle 100.

When executing the rider assistance operation, the vehicle speed control execution section 22 outputs the control command to the notification device 50, as necessary. The notification device 50 may notify a caution or information by a display (that is, perception in which a visual organ is used as a sensory organ), may notify a caution or information by a sound (that is, perception in which an auditory organ is used as a sensory organ), or may notify a caution or information by a vibration (that is, perception in which a tactile organ is used as a sensory organ). For example, the notification device 50 is a display, a lamp, a speaker, a vibrator, or the like. The notification device 50 may be provided to the motorcycle 100, or may be provided to the appurtenance attached to the motorcycle 100 (for example, a helmet, gloves, and the like). In addition, the notification operation may notify a caution or information by causing momentary deceleration or acceleration in the motorcycle 100. That is, the notification device 50 may include the braking device 30 or the driving device 40. In some cases, the notification device 50 may be provided to a vehicle different from the motorcycle 100 or an appurtenance attached to the vehicle (for example, a helmet, gloves, and the like).

The vehicle speed control execution section 22 determines whether or not a group driving mode is valid while the motorcycle 100 is driving. As illustrated in FIG. 3 and FIG. 4, the group driving mode is a mode in which at least three motorcycles 200 including the motorcycle 100 perform group driving, that is, driving of forming an array in a body.

For example, in the group driving mode, the validity and the invalidity are automatically switched by the vehicle speed control execution section 22, on the basis of the surrounding environment information that is acquired by the acquisition section 21, and the vehicle speed control execution section 22 determines whether or not the group driving mode is valid, on the basis of information on the switching. The vehicle speed control execution section 22 determines whether or not the driving of at least three motorcycles 200 including the motorcycle 100 in a specific mode (for example, a mode as illustrated in FIG. 3 in which two lines L1 and L2 of vehicles are formed such that at least three motorcycles 200 including the motorcycle 100 are arranged in a zig-zag manner, a mode as illustrated in FIG. 4 in which the lines L1 and L2 of vehicles are formed such that every two of at least three motorcycles 200 including the motorcycle 100 are arranged right beside each other, or the like) continues for longer than a reference time or a reference driving distance, on the basis of the surrounding environment information that is acquired by the acquisition section 21, and automatically validates the group driving mode in a case where the determination is affirmative. The vehicle speed control execution section 22 may specify the other motorcycle 200 positioned in a driving lane L on which the motorcycle 100 drives, and may set only the specified other motorcycle 200 as a determination target, or may specify the other motorcycle 200 continuously positioned around the motorcycle 100 for longer than a reference time or a reference driving distance, without using information on the boundary of the driving lane L, and may set the specified other motorcycle 200 as a determination target.

For example, in the group driving mode, the validity and the invalidity are switched by the setting input of the rider, and the vehicle speed control execution section 22 determines whether or not the group driving mode is valid, on the basis of the output of the setting input device 13 that is acquired by the acquisition section 21. Note that, the vehicle speed control execution section 22 may automatically propose the validation and/or invalidation of the group driving mode, on the basis of the surrounding environment information that is acquired by the acquisition section 21, and the proposal may be confirmed by acceptance setting input of the rider.

In a case where the group driving mode is not valid, the vehicle speed control execution section 22 allows the motorcycle 100 to execute an operation of performing positional relationship adjustment between the motorcycle 100 and a preceding vehicle 300 that drives in front of the motorcycle 100 among a plurality of preceding vehicles 300 traveling ahead of the motorcycle 100, as the vehicle speed control operation. Note that, in the positional relationship adjustment, positional relationship information between motorcycle 100 and the other preceding vehicle 300 that does not drive in front of the motorcycle 100 may be added. In addition, in the positional relationship adjustment, positional relationship information between the motorcycle 100 and the other vehicle that does not travel ahead of the motorcycle 100 may be added.

In a case where the group driving mode is valid, the vehicle speed control execution section 22 allows the motorcycle 100 to execute an operation of performing positional relationship adjustment between the motorcycle 100 and at least one motorcycle 200 that corresponds to the preceding vehicle 300 traveling ahead of the motorcycle 100 and performs the group driving together with the motorcycle 100, as the vehicle speed control operation. Note that, in the positional relationship adjustment, positional relationship information between the motorcycle 100 and at least one motorcycle 200 that corresponds to a vehicle not traveling ahead of the motorcycle 100 and performs the group driving together with the motorcycle 100 may be added. Whether or not the motorcycle 200 is a vehicle driving in a group together with the motorcycle 100 may be determined on the basis of timeline information on a positional relationship with respect to the motorcycle 100, or may be determined on the basis of information registered in advance by the rider. The information registered in advance by the rider, for example, is information on the arrangement of the motorcycle 100 (for example, the head, the middle, the tail, the order from the head or the tail, the right line of vehicles, the left line of vehicles, and the like) in the array that is formed by the group driving, information for identifying the motorcycle 200 belonging to the group (for example, the type of vehicle, a color, information on an identification plate, and the like), or the like.

The positional relationship adjustment may be an operation of adjusting a positional relationship between the motorcycle 100 and the preceding vehicle 300 by automatically causing deceleration or acceleration in the motorcycle 100 without manipulating the braking device 30 and the driving device 40 by the rider (for example, an adaptive cruise control operation using the preceding vehicle 300 as a speed tracking target, an operation of operating the braking device 30 for controlling an inter-vehicular distance or a transit time difference with respect to the preceding vehicle 300 to a distance or a time difference according to a manipulation amount thereof in a state where the rider manipulates the driving device 40, an operation of operating the driving device 40 for controlling an inter-vehicular distance or a transit time difference with respect to the preceding vehicle 300 to a distance or a time difference according to a manipulation amount thereof in a state where the rider manipulates the braking device 30, or the like), may be an operation of adjusting the positional relationship between the motorcycle 100 and the preceding vehicle 300 by automatically increasing or decreasing a braking force caused in the motorcycle 100 such that the excess or deficiency of the manipulation of the braking device 30 by the rider is corrected, or may be an operation of adjusting the positional relationship between the motorcycle 100 and the preceding vehicle 300 by automatically increasing or decreasing a driving force caused in the motorcycle 100 such that the excess or deficiency of the manipulation of the driving device 40 by the rider is corrected.

When the vehicle speed control execution section 22 executes the vehicle speed control operation in a state where the group driving mode is valid, the alignment operation execution section 23 executes an alignment operation of aligning at least a part of the array that is formed by the group driving. The alignment operation execution section 23 executes at least one of an alignment operation of a lateral direction position and an alignment operation of a front-back direction position described below. Here, a lateral direction and a front-back direction may be a direction that is defined with respect to the vehicle body of the motorcycle 100, or may be a direction that is defined with respect to the driving lane L.

[Alignment Operation of Lateral Direction Position]

The alignment operation execution section 23 outputs the control command to the notification device 50, and executes an operation of causing a notification that urges the rider of the motorcycle 100 to change the lateral direction position of the motorcycle 100 in the array, as the alignment operation of the lateral direction position. The alignment operation execution section 23 may execute the alignment operation, on the basis of the positional relationship information between the motorcycle 100 and at least two motorcycles 200 driving in a group together with the motorcycle 100. In this case, the motorcycle 100 corresponds to "motorcycle of which a position is desired to be changed in accordance with an alignment operation" in the invention, that is, a "first motorcycle" in the invention. In addition, the remaining motorcycles 200 correspond to a "second motorcycle" and a "third motorcycle" in the invention.

For example, in an example illustrated in FIG. 3, the alignment operation execution section 23 acquires a distance DL in the lateral direction between the motorcycle 100 and at least two motorcycles 200 belonging to the line L2 of vehicles different from the line L1 of vehicles to which the motorcycle 100 belongs in the group driving, on the basis of the surrounding environment information that is acquired by the acquisition section 21. The distance DL may be an actual measurement value at the point, or may be a prediction value that is assumed by adding the driving state of the motorcycles 100 and 200 at the point. Note that, the distance DL is a concept in which a distance from the motorcycle 100 to a target positioned on one side in the lateral direction is positive, and a distance to a target positioned on the other side from the motorcycle 100 in the lateral direction is negative. In a case where all the distances DL are less or greater than a reference value instantaneously or for longer than a reference time or a reference driving distance, the alignment operation execution section 23 outputs the control command to the notification device 50, and urges the rider of the motorcycle 100 to correct the lateral direction position. The reference value may be a fixed value, or may be a variable value that is set in accordance with a positional relationship between the motorcycles 200 other than the motorcycle 100. In order to determine whether or not it is necessary to change the position, the alignment operation execution section 23 may acquire the distance DL with respect to at least one motorcycle 200 traveling ahead of the motorcycle 100 and at least one motorcycle 200 traveling behind the motorcycle 100, may acquire the distance DL only with respect to at least two motorcycles 200 traveling ahead of the motorcycle 100, or may acquire the distance DL only with respect to at least two motorcycles 200 traveling behind the motorcycle 100. In addition, in order to determine whether or not it is necessary to change the position, the alignment operation execution section 23 may acquire the distance DL with respect to at least one motorcycle 200 belonging to the line L2 of vehicles different from the line L1 of vehicles to which the motorcycle 100 belongs in the group driving, and at least one motorcycle 200 belonging to the line L1 of vehicles to which the motorcycle 100 belongs in the group driving, or may acquire the distance DL only with respect to at least two motorcycles 200 belonging to the line L1 of vehicles to which the motorcycle 100 belongs in the group driving. The alignment operation execution section 23 may change the selection of the motorcycle 200 to be an acquisition target of the distance DL, on the basis of the information on the arrangement of the motorcycle 100 (for example, the head, the middle, the tail, the order from the head or the tail, the right line of vehicles, the left line of vehicles, and the like) in the array. For example, in a case where the motorcycle 100 is arranged at the head in the array, the distance DL only with respect to at least two motorcycles 200 traveling behind the motorcycle 100 may be acquired. In addition, for example, in a case where the motorcycle 100 is arranged at the middle in the array, the distance DL with respect to at least one motorcycle 200 traveling ahead of the motorcycle 100 and at least one motorcycle 200 traveling behind the motorcycle 100 may be acquired. In addition, for example, in a case where the motorcycle 100 is arranged at the tail in the array, the distance DL only with respect to at least two motorcycles 200 traveling ahead of the motorcycle 100 may be acquired. The motorcycle 200 driving near the motorcycle 100 may be selected as the acquisition target of the distance DL.

For example, in an example illustrated in FIG. 4, the alignment operation execution section 23 acquires the distance DL in the lateral direction between the motorcycle 100 and at least two motorcycles 200 belonging to the line L1 of vehicles to which the motorcycle 100 belongs in the group driving, on the basis of the surrounding environment information that is acquired by the acquisition section 21. The distance DL may be an actual measurement value at the point, or may be a prediction value that is assumed by adding the driving state of the motorcycles 100 and 200 at the point. Note that, the distance DL is a concept in which a distance from the motorcycle 100 to a target positioned on one side in the lateral direction is positive, and a distance to a target positioned on the other side from the motorcycle 100 in the lateral direction is negative. In a case where all the distances DL are less or greater than a reference value instantaneously or for longer than a reference time or a reference driving distance, the alignment operation execution section 23 outputs the control command to the notification device 50, and urges the rider of the motorcycle 100 to correct the lateral direction position. The reference value may be a fixed value, or may be a variable value that is set in accordance with a positional relationship between the motorcycles 200 other than the motorcycle 100. In order to determine whether or not it is necessary to change the position, the alignment operation execution section 23 may acquire the distance DL with respect to at least one motorcycle 200 traveling ahead of the motorcycle 100 and at least one motorcycle 200 traveling behind the motorcycle 100, may acquire the distance DL only with respect to at least two motorcycles 200 traveling ahead of the motorcycle 100, or may acquire the distance DL only with respect to at least two motorcycles 200 traveling behind the motorcycle 100. In addition, in order to determine whether or not it is necessary to change the position, the alignment operation execution section 23 may acquire the distance DL with respect to at least one motorcycle 200 belonging to the line L1 of vehicles to which the motorcycle 100 belongs in the group driving, and at least one motorcycle 200 belonging to the line L2 of vehicles different from the line L1 of vehicles to which the motorcycle 100 belongs in the group driving, or may acquire the distance DL only with respect to at least two motorcycles 200 belonging to the line L2 of vehicles different from the line L1 of vehicles to which the motorcycle 100 belongs in the group driving. The alignment operation execution section 23 may change the selection of the motorcycle 200 to be an acquisition target of the distance DL, on the basis of the information on the arrangement of the motorcycle 100 (for example, the head, the middle, the tail, the order from the head or the tail, the right line of vehicles, the left line of vehicles, and the like) in the array. For example, in a case where the motorcycle 100 is arranged at the head in the array, the distance DL only with respect to at least two motorcycles 200 traveling behind the motorcycle 100 may be acquired. In addition, for example, in a case where the motorcycle 100 is arranged at the middle in the array, the distance DL with respect to at least one motorcycle 200 traveling ahead of the motorcycle 100 and at least one motorcycle 200 traveling behind the motorcycle 100 may be acquired. In addition, for example, in a case where the motorcycle 100 is arranged at the tail in the array, the distance DL only with respect to at least two motorcycles 200 traveling ahead of the motorcycle 100 may be acquired. The motorcycle 200 driving near the motorcycle 100 may be selected as the acquisition target of the distance DL.

As a specific example, the notification device 50 displays an emblem ML for urging the rider of the motorcycle 100 to correct the lateral direction position, in accordance with the control command from the alignment operation execution section 23. For example, in the example illustrated in FIG. 3, as illustrated in FIG. 5 and FIG. 6, the notification device 50 displays the emblem ML in addition to an emblem MG indicating that the vehicle speed control execution section 22 executes the vehicle speed control operation in a state where the group driving mode is valid. For example, in the example illustrated in FIG. 4, as illustrated in FIG. 7 and FIG. 8, the notification device 50 displays the emblem ML in addition to the emblem MG indicating that the vehicle speed control execution section 22 executes the vehicle speed control operation in a state where the group driving mode is valid. The emblem MG may not be displayed, or the emblem MG may indicate that the vehicle speed control execution section 22 executes the vehicle speed control operation and may not be changed when the group driving mode is in a valid state from an invalid state. In a case where the line L1 of vehicles to which the motorcycle 100 belongs is the right line of vehicles, the emblem ML may be displayed on the right side, and in a case where the line L1 of vehicles to which the motorcycle 100 belongs is the left line of vehicles, the emblem ML may be displayed on the left side. The notification device 50 may urge the rider to correct the lateral direction position by a display different from the emblem ML, in accordance with the control command from the alignment operation execution section 23. For example, in the case of urging the rider to correct the position to the right direction, a spot positioned on the right side from the center of the motorcycle 100 may be subjected to lighting or blinking, and in the case of urging the rider to correct the position to the left direction, a spot positioned on the left side from the center of the motorcycle 100 may be subjected to lighting or blinking. In addition, the notification device 50 may output a message for urging the rider of the motorcycle 100 to correct the lateral direction position by a display or a voice, in accordance with the control command from the alignment operation execution section 23. The notification device 50 may urge the rider to correct the lateral direction position by a mere sound, in accordance with the control command from the alignment operation execution section 23. For example, in the case of urging the rider to correct the position to the right direction, the sound may be produced from the spot positioned on the right side from the center of the motorcycle 100, and in the case of urging the rider to correct the position to the left direction, the sound may be produced from the spot positioned on the left side from the center of the motorcycle 100. In addition, the notification device 50 may output a vibration for urging the rider of the motorcycle 100 to correct the lateral direction position, in accordance with the control command from the alignment operation execution section 23. For example, in the case of urging the rider to correct the position to the right direction, the spot positioned on the right side from the center of the motorcycle 100 may be vibrated, and in the case of urging the rider to correct the position to the left direction, the spot positioned on the left side from the center of the motorcycle 100 may be vibrated. The spot, for example, may be a part of a handlebar, gloves, or the like. It is preferable that the direction of the correction of the lateral direction position to be required is notified to the rider, but the direction may not be notified. That is, only the presence or absence of the necessity for the correction may be notified to the rider. In addition, it is preferable that the degree of correction of the lateral direction position to be required is notified to the rider, but the degree may not be notified.

The alignment operation execution section 23 may determine whether or not to execute the alignment operation, on the basis of a driving stability of the motorcycle 100. For example, the alignment operation execution section 23 does not output the notification for urging the notification device 50 to correct the lateral direction position, in a state where a roll angle, a yaw rate, a yaw angle, lateral acceleration, and/or an addition-subtraction speed of the motorcycle 100 are greater than a reference value.

Note that, in the above description, a case has been described in which the alignment operation execution section 23 acquires the distance DL in the lateral direction and determines whether or not it is necessary to change the position, but the invention is not limited to such a mode, and the alignment operation execution section 23 may acquire other positional relationship information and may determine whether or not it is necessary to change the position. For example, the alignment operation execution section 23 may acquire information on the line of vehicles of the motorcycle 100 and information on the line of vehicles of the at least two motorcycles 200 and may determine whether or not it is necessary to change the position. Here, the information on the line of vehicles is information indicating to which of the right line of vehicles and the left line of vehicles the motorcycles 100 and 200 belong, in the array that is formed by the group driving. The alignment operation execution section 23 defines a straight line to be the boundary between the right line of vehicles and the left line of vehicles in the array, on the basis of the surrounding environment information that is acquired by the acquisition section 21, and acquires the information on the line of vehicles of each of the motorcycles 100 and 200, on the basis of a positional relationship with respect to the straight line.

For example, in the example illustrated in FIG. 3, the alignment operation execution section 23 determines the line of vehicles to which each of the motorcycle 100, the motorcycle 200 traveling nearest ahead of the motorcycle 100, and the motorcycle 200 traveling nearest behind the motorcycle 100 belongs. In a case where it is determined that all the vehicles belong to the same line of vehicles, the alignment operation execution section 23 urges the rider of the motorcycle 100 to correct the lateral direction position. Note that, the alignment operation execution section 23 may determine whether or not it is necessary to change the position by determining the lines of vehicles to which the motorcycle 100, the motorcycle 200 traveling nearest ahead of the motorcycle 100, and the motorcycle 200 traveling nearest ahead of the motorcycle 200 belong. In addition, the alignment operation execution section 23 may determine whether or not it is necessary to change the position by determining the lines of vehicles to which the motorcycle 100, the motorcycle 200 traveling nearest behind the motorcycle 100, and the motorcycle 200 traveling nearest behind the motorcycle 200 belong.

For example, in the example illustrated in FIG. 4, the alignment operation execution section 23 determines the line of vehicles to which each of the motorcycle 100, the motorcycle 200 traveling beside the motorcycle 100, and the motorcycle 200 traveling nearest ahead of or behind the motorcycle 200 belongs. In a case where it is determined that all the vehicles belong to the same line of vehicles, the alignment operation execution section 23 urges the rider of the motorcycle 100 to correct the lateral direction position.

In addition, in the above description, a case has been described in which the alignment operation execution section 23 outputs the control command to the notification device 50 of the motorcycle 100, on the basis of the positional relationship information between the motorcycle 100 and at least two motorcycles 200 driving in a group together with the motorcycle 100, and executes the alignment operation, but the invention is not limited to such a mode. For example, the alignment operation execution section 23 may output the control command to the notification device 50 of the motorcycle 200 other than the motorcycle 100, on the basis of the positional relationship information between the motorcycle 100 and at least two motorcycles 200 driving in a group together with the motorcycle 100. In this case, the motorcycle 200 to which the notification device 50 receiving the control command is provided corresponds to the "motorcycle of which a position is desired to be changed in accordance with an alignment operation" in the invention, that is, the "first motorcycle" in the invention. In addition, the motorcycle 100 and the remaining motorcycle 200 correspond to the "second motorcycle" and the "third motorcycle" in the invention.

[Alignment Operation of Front-Back Direction Position]

The alignment operation execution section 23 outputs the control command to the notification device 50, and executes an operation of causing a notification of urging the rider of the motorcycle 100 to change the front-back direction position of the motorcycle 100 in the array, as the alignment operation of the front-back direction position. The alignment operation execution section 23 may execute the alignment operation, on the basis of the positional relationship information between the motorcycle 100 and at least two motorcycles 200 driving in a group together with the motorcycle 100. In this case, the motorcycle 100 corresponds to the "motorcycle of which a position is desired to be changed in accordance with an alignment operation" in the invention, that is, the "first motorcycle" in the invention. In addition, the remaining motorcycles 200 correspond to the "second motorcycle" and the "third motorcycle" in the invention.

For example, in the example illustrated in FIG. 3, the alignment operation execution section 23 acquires the distance DV in the front-back direction between the motorcycle 100 and at least two motorcycles 200 belonging to the line L2 of vehicles different from the line L1 of vehicles to which the motorcycle 100 belongs in the group driving, on the basis of the surrounding environment information that is acquired by the acquisition section 21. The distance DV may be an actual measurement value at the point, or may be a prediction value that is assumed by adding the driving state of the motorcycles 100 and 200 at the point. Note that, the distance DV is a concept in which a distance from the motorcycle 100 to a target positioned on one side in the front-back direction and a distance to a target positioned on the other side from the motorcycle 100 in the front-back direction are positive. In a case where there is an imbalance greater than a reference in the distances DV instantaneously or for longer than a reference time or a reference driving distance, the alignment operation execution section 23 outputs the control command to the notification device 50, and urges the rider of the motorcycle 100 to correct the front-back direction position. Note that, the value of a transit time difference that is obtained by dividing the value of the distance DV by the vehicle speed of the motorcycle 100 may be used in the determination, instead of the distance DV. In an ideal array, in a case where there is originally a difference between the distances DV, the acquired distance DV is corrected by the difference, on the basis of the information on the arrangement of each of the vehicles (for example, the head, the middle, the tail, the order from the head or the tail, the right line of vehicles, the left line of vehicles, and the like) in the array, and then, the imbalance is determined. In order to determine whether or not it is necessary to change the position, the alignment operation execution section 23 may acquire the distance DV with respect to at least one motorcycle 200 traveling ahead of the motorcycle 100 and at least one motorcycle 200 traveling behind the motorcycle 100, may acquire the distance DV only with respect to at least two motorcycles 200 traveling ahead of the motorcycle 100, or may acquire the distance DV only with respect to at least two motorcycles 200 traveling behind the motorcycle 100. In addition, in order to determine whether or not it is necessary to change the position, the alignment operation execution section 23 may acquire the distance DV with respect to at least one motorcycle 200 belonging to the line L2 of vehicles different from the line L1 of vehicles to which the motorcycle 100 belongs in the group driving, and at least one motorcycle 200 belonging to the line L1 of vehicles to which the motorcycle 100 belongs in the group driving, or may acquire the distance DV only with respect to at least two motorcycles 200 belonging to the line L1 of vehicles to which the motorcycle 100 belongs in the group driving. The alignment operation execution section 23 may change the selection of the motorcycle 200 to be an acquisition target of the distance DV, on the basis of the information on the arrangement of the motorcycle 100 (for example, the head, the middle, the tail, the order from the head or the tail, the right line of vehicles, the left line of vehicles, and the like) in the array. For example, in a case where the motorcycle 100 is arranged at the head in the array, the distance DV only with respect to at least two motorcycles 200 traveling behind the motorcycle 100 may be acquired. In addition, for example, in a case where the motorcycle 100 is arranged at the middle in the array, the distance DV with respect to at least one motorcycle 200 traveling ahead of the motorcycle 100 and at least one motorcycle 200 traveling behind the motorcycle 100 may be acquired. In addition, for example, in a case where the motorcycle 100 is arranged at the tail in the array, the distance DV only with respect to at least two motorcycles 200 traveling ahead of the motorcycle 100 may be acquired. The motorcycle 200 driving near the motorcycle 100 may be selected as the acquisition target of the distance DV. Note that, in the above description, an imbalance in the position of the motorcycle 100 (that is, the distance DV between the motorcycle 100 and another motorcycle 200) is determined on the basis of the distance DV between the motorcycle 100 and the other motorcycles 200, but the imbalance in the position of the motorcycle 100 may be determined on the basis of the distance DV between the other motorcycles 200. In this case, a plurality of distances DV between the other motorcycles 200 may be acquired by changing the combination of the other motorcycles 200, and the imbalance in the position of the motorcycle 100 may be determined on the basis of a statistical value of the plurality of distances DV (for example, an average value, an average value excluding the distance DV greater than an upper limit value, an average value excluding the distance DV less than a lower limit value, an average value of only the distances DV less than the upper limit value and greater than the lower limit value, a minimum value, a maximum value, a value subjected to a low-pass filter, a value subjected to a high-pass filter, a value subjected to a step filter, and the like).

For example, in the example illustrated in FIG. 4, the alignment operation execution section 23 acquires the distance DV in the front-back direction between the motorcycle 100 and at least two motorcycles 200 belonging to the line L1 of vehicles to which the motorcycle 100 belongs in the group driving, on the basis of the surrounding environment information that is acquired by the acquisition section 21. The distance DV may be an actual measurement value at the point, or may be a prediction value that is assumed by adding the driving state of the motorcycles 100 and 200 at the point. Note that, the distance DV is a concept in which a distance from the motorcycle 100 to a target positioned on one side in the front-back direction and a distance to a target positioned on the other side from the motorcycle 100 in the front-back direction are positive. In a case where there is an imbalance greater than a reference in the distances DV instantaneously or for longer than a reference time or a reference driving distance, the alignment operation execution section 23 outputs the control command to the notification device 50, and urges the rider of the motorcycle 100 to correct the front-back direction position. Note that, the value of a transit time difference that is obtained by dividing the value of the distance DV by the vehicle speed of the motorcycle 100 may be used in the determination, instead of the distance DV In an ideal array, in a case where there is originally a difference between the distances DV, the acquired distance DV is corrected by the difference, on the basis of the information on the arrangement of each of the vehicles (for example, the head, the middle, the tail, the order from the head or the tail, the right line of vehicles, the left line of vehicles, and the like) in the array, and then, the imbalance is determined. In order to determine whether or not it is necessary to change the position, the alignment operation execution section 23 may acquire the distance DV with respect to at least one motorcycle 200 traveling ahead of the motorcycle 100 and at least one motorcycle 200 traveling behind the motorcycle 100, may acquire the distance DV only with respect to at least two motorcycles 200 traveling ahead of the motorcycle 100, or may acquire the distance DV only with respect to at least two motorcycles 200 traveling behind the motorcycle 100. In addition, in order to determine whether or not it is necessary to change the position, the alignment operation execution section 23 may acquire the distance DV with respect to at least one motorcycle 200 belonging to the line L1 of vehicles to which the motorcycle 100 belongs in the group driving, and at least one motorcycle 200 belonging to the line L2 of vehicles different from the line L1 of vehicles to which the motorcycle 100 belongs in the group driving, or may acquire the distance DV only with respect to at least two motorcycles 200 belonging to the line L2 of vehicles different from the line L1 of vehicles to which the motorcycle 100 belongs in the group driving. The alignment operation execution section 23 may change the selection of the motorcycle 200 to be an acquisition target of the distance DV, on the basis of the information on the arrangement of the motorcycle 100 (for example, the head, the middle, the tail, the order from the head or the tail, the right line of vehicles, the left line of vehicles, and the like) in the array. For example, in a case where the motorcycle 100 is arranged at the head in the array, the distance DV only with respect to at least two motorcycles 200 traveling behind the motorcycle 100 may be acquired. In addition, for example, in a case where the motorcycle 100 is arranged at the middle in the array, the distance DV with respect to at least one motorcycle 200 traveling ahead of the motorcycle 100 and at least one motorcycle 200 traveling behind the motorcycle 100 may be acquired. In addition, for example, in a case where the motorcycle 100 is arranged at the tail in the array, the distance DV only with respect to at least two motorcycles 200 traveling ahead of the motorcycle 100 may be acquired. The motorcycle 200 driving near the motorcycle 100 may be selected as the acquisition target of the distance DV. Note that, in the above description, an imbalance in the position of the motorcycle 100 (that is, the distance DV between the motorcycle 100 and another motorcycle 200) is determined on the basis of the distance DV between the motorcycle 100 and the other motorcycles 200, but the imbalance in the position of the motorcycle 100 may be determined on the basis of the distance DV between the motorcycles 200. In this case, a plurality of distances DV between the other motorcycles 200 may be acquired by changing the combination of the other motorcycles 200, and the imbalance in the position of the motorcycle 100 may be determined on the basis of a statistical value of the plurality of distances DV (for example, an average value, an average value excluding the distance DV greater than an upper limit value, an average value excluding the distance DV less than a lower limit value, an average value of only the distances DV less than the upper limit value and greater than the lower limit value, a minimum value, a maximum value, a value subjected to a low-pass filter, a value subjected to a high-pass filter, a value subjected to a step filter, and the like).

As a specific example, the notification device 50 displays an emblem MV for urging the rider of the motorcycle 100 to correct the front-back direction position, in accordance with the control command from the alignment operation execution section 23. For example, in the example illustrated in FIG. 3, as illustrated in FIG. 5 and FIG. 6, the notification device 50 displays the emblem MV in addition to the emblem MG indicating that the vehicle speed control execution section 22 executes the vehicle speed control operation in a state where the group driving mode is valid. For example, in the example illustrated in FIG. 4, as illustrated in FIG. 7 and FIG. 8, the notification device 50 displays the emblem MV in addition to the emblem MG indicating that the vehicle speed control execution section 22 executes the vehicle speed control operation in a state where the group driving mode is valid. The emblem MG may not be displayed, or the emblem MG may indicate that the vehicle speed control execution section 22 executes the vehicle speed control operation and may not be changed when the group driving mode is in a valid state from an invalid state. In a case where the line L1 of vehicles to which the motorcycle 100 belongs is the right line of vehicles, the emblem MV may be displayed on the right side, and in a case where the line L1 of vehicles to which the motorcycle 100 belongs is the left line of vehicles, the emblem MV may be displayed on the left side. The notification device 50 may urge the rider to correct the front-back direction position by a display different from the emblem MV, in accordance with the control command from the alignment operation execution section 23. For example, in the case of urging the rider to correct the position to the front direction, a spot positioned on the upper side may be subjected to lighting or blinking, and in the case of urging the rider to correct the position to the back direction, a spot positioned on the lower side may be subjected to lighting or blinking. In addition, the notification device 50 may output a message for urging the rider of the motorcycle 100 to correct the front-back direction position by a display or a voice, in accordance with the control command from the alignment operation execution section 23. The notification device 50 may urge the rider to correct the front-back direction position by a mere sound, in accordance with the control command from the alignment operation execution section 23. For example, in the case of urging the rider to correct the position to the front direction, the sound may be produced from the spot positioned in front, and in the case of urging the rider to correct the position to the back direction, the sound may be produced from the spot positioned in back. In addition, the notification device 50 may output a vibration for urging the rider of the motorcycle 100 to correct the front-back direction position, in accordance with the control command from the alignment operation execution section 23. For example, in the case of urging the rider to correct the position to the front direction, the spot positioned in front may be vibrated, and in the case of urging the rider to correct the position to the back direction, the spot positioned in the back may be vibrated. It is preferable that the direction of the correction of the front-back direction position to be required is notified to the rider, but the direction may not be notified. That is, only the presence or absence of the necessity for the correction may be notified to the rider. In addition, it is preferable that the degree of correction of the front-back direction position to be required is notified to the rider, but the degree may not be notified.

The alignment operation execution section 23 may determine whether or not to execute the alignment operation, on the basis of the driving stability of the motorcycle 100. For example, the alignment operation execution section 23 does not output the notification for urging the notification device 50 to correct the front-back direction position, in a state where a roll angle, a yaw rate, a yaw angle, lateral acceleration, and/or an addition-subtraction speed of the motorcycle 100 are greater than a reference value.

Note that, in the above description, a case has been described in which the alignment operation execution section 23 outputs the control command to the notification device 50 of the motorcycle 100, on the basis of the positional relationship information between the motorcycle 100 and at least two motorcycles 200 driving in a group together with the motorcycle 100, and executes the alignment operation, but the invention is not limited to such a mode. For example, the alignment operation execution section 23 may output the control command to the notification device 50 of the motorcycle 200 other than the motorcycle 100, on the basis of the positional relationship information between the motorcycle 100 and at least two motorcycles 200 driving in a group together with the motorcycle 100. In this case, the motorcycle 200 to which the notification device 50 receiving the control command is provided corresponds to the "motorcycle of which a position is desired to be changed in accordance with an alignment operation" in the invention, that is, the "first motorcycle" in the invention. In addition, the motorcycle 100 and the remaining motorcycle 200 correspond to the "second motorcycle" and the "third motorcycle" in the invention.

In addition, in the above description, a case has been described in which the alignment operation is the operation of outputting the control command for allowing the notification device 50 to cause the notification that urges the rider of the motorcycle 100 or the other motorcycle 200 to change the front-back direction position, but the alignment operation may be an operation of outputting the control command for allowing the motorcycle 100 or the other motorcycle 200 to change the front-back direction position. For example, the alignment operation execution section 23 outputs the control command for allowing the motorcycle 100 or the other motorcycle 200 to automatically cause deceleration or acceleration regardless of the manipulation of the braking device 30 and the driving device 40 by the rider. The alignment operation may be an operation of changing a setting value of the vehicle speed control operation that is executed in the motorcycle 100 or the other motorcycle 200. For example, in the case of urging the rider to correct the position to the front direction, the alignment operation execution section 23 automatically changes the inter-vehicular distance or the transit time difference with respect to the preceding vehicle 300 that is set in the vehicle speed control operation to be shorter. In addition, for example, in the case of urging the rider to correct the position to the back direction, the alignment operation execution section 23 automatically changes the inter-vehicular distance or the transit time difference with respect to the preceding vehicle 300 that is set in the vehicle speed control operation to be longer. In such a change, the value itself of the inter-vehicular distance or the transit time difference may be changed, or the rank of the inter-vehicular distance or the transit time difference may be changed. The alignment operation execution section 23 may automatically propose such a change, and the proposal may be confirmed by acceptance setting input of the rider. Such a change may be reflected on the display of the setting value of the vehicle speed control operation.

<Operation of Rider Assistance System>

The operation of the rider assistance system according to the embodiment will be described.

FIG. 9 is a diagram illustrating an operation flow of the control device of the rider assistance system according to the embodiment of the invention.

The control device 20 executes the operation flow illustrated in FIG. 9 while the motorcycle 100 is driving.

(Acquisition Step)

In step S101, the acquisition section 21 acquires the surrounding environment information on the motorcycle 100 while the motorcycle 100 is driving. In addition, the acquisition section 21 acquires various information pieces, as necessary.

(Vehicle Speed Control Execution Step)

In step S102, the vehicle speed control execution section 22 determines whether or not the group driving mode is valid. In step S102, in a case where it is determined that the group driving mode is not valid, in step S103, the vehicle speed control execution section 22 allows the motorcycle 100 to execute the operation of performing the positional relationship adjustment between the motorcycle 100 and the preceding vehicle 300 that drives in front of the motorcycle 100 among the plurality of preceding vehicles 300 traveling ahead of the motorcycle 100, as the vehicle speed control operation. In addition, in step S102, in a case where it is determined that the group driving mode is valid, in step S104, the vehicle speed control execution section 22 allows the motorcycle 100 to execute the operation of performing the positional relationship adjustment between the motorcycle 100 and at least one motorcycle 200 that corresponds to the preceding vehicle 300 traveling ahead of the motorcycle 100 and performs the group driving together with the motorcycle 100, as the vehicle speed control operation.

(Alignment Operation Execution Step)

In step S102, in a case where it is determined that the group driving mode is valid, in step S105, the alignment operation execution section 23 executes the alignment operation of aligning at least a part of the array that is formed by the group driving.

<Effect of Rider Assistance System>

The effect of the rider assistance system according to the embodiment will be described.

In the rider assistance system 1, the vehicle speed control execution section 22 executes the vehicle speed control operation of the motorcycle 100, on the basis of the positional relationship information between the motorcycle 100 and at least one preceding vehicle 300 that is acquired while the motorcycle 100 is driving, and the alignment operation execution section 23 executes the alignment operation of aligning at least a part of the array that is formed by at least three motorcycles 200, in the vehicle speed control operation in a state where the group driving mode is valid. Accordingly, it is possible to suitably assist group driving of a specific vehicle such as a motorcycle.

Preferably, the alignment operation is the operation of outputting the control command for causing the notification that urges the rider to change the lateral direction position of at least one of the motorcycle 100 and the motorcycle 200 other than the motorcycle 100 in the array. According to the configuration as described above, the reliability of suitably assisting the group driving of the specific vehicle such as the motorcycle is improved.

Preferably, the alignment operation is the operation of outputting the control command for causing the notification that urges the rider to change the front-back direction position of at least one of the motorcycle 100 and the motorcycle 200 other than the motorcycle 100 in the array. According to the configuration as described above, the reliability of suitably assisting the group driving of the specific vehicle such as the motorcycle is improved.

Preferably, the alignment operation is the operation of outputting the control command for changing the front-back direction position of at least one of the motorcycle 100 and motorcycle 200 other than the motorcycle 100 in the array. According to the configuration as described above, the reliability of suitably assisting the group driving of the specific vehicle such as the motorcycle is improved. In particular, the alignment operation may be the operation of changing the setting value of the vehicle speed control operation that is executed in the motorcycle 100 or the motorcycle 200 other than the motorcycle 100. According to the configuration as described above, the comfortableness of the rider is improved.

Preferably, the alignment operation execution section 23 changes a vehicle to be selected in order to determine whether or not it is necessary to change the position, on the basis of the information on the arrangement of the motorcycle 100 (for example, the head, the middle, the tail, the order from the head or the tail, the right line of vehicles, the left line of vehicles, and the like) in the array. According to the configuration as described above, the reliability of suitably assisting the group driving of the specific vehicle such as the motorcycle is improved.

Preferably, the alignment operation execution section 23 executes the alignment operation, on the basis of the driving stability of the motorcycle 100 or the motorcycle 200 other than the motorcycle 100, of which the position is desired to be changed in accordance with the alignment operation. According to the configuration as described above, the alignment operation is prevented from affecting the driving.

As described above, the embodiment has been described, but only a part of the embodiment may be implemented, or a part of the embodiment may be changed to a different mode. That is, the invention is not limited to the description of the embodiment.

For example, in the above description, a case has been described in which the acquisition section 21 acquires the surrounding environment information on the motorcycle 100, on the basis of the output of the surrounding environment sensor 11, but the acquisition section 21 may acquire the surrounding environment information on the motorcycle 100 by using other means (for example, wireless communication with a vehicle driving around the motorcycle 100, wireless communication with an infrastructure facility, or the like).

REFERENCE SIGNS LIST

1: Rider assistance system
11: Surrounding environment sensor
12: Vehicle behavior sensor
13: Setting input device
20: Control device
21: Acquisition section
22: Vehicle speed control execution section
23: Alignment operation execution section
30: Braking device
40: Driving device
50: Notification device
100, 200: Motorcycle
300: Preceding vehicle
L: Driving lane
L1, L2: Line of vehicles
MG, ML, MV: Emblem

The invention claimed is:

1. A control device (20) of a rider assistance system (1), comprising:

an electronic processor configured to execute a vehicle speed control operation of an own-vehicle (100), based on positional relationship information between the own-vehicle (100) and at least one preceding vehicle (300) that is acquired while the own-vehicle (100) is driving, wherein the vehicle speed control execution section (22) determines whether or not a group driving mode, which is a mode in which at least three motorcycles (200) including the own-vehicle (100) perform group driving, is valid while the motorcycle (100) is driving; and execute an alignment operation of aligning at least a part of an array that is formed by the at least three motorcycles (200) in the vehicle speed control operation in a state in which the group driving mode is valid, the alignment operation including an alignment operation of a lateral direction position.

2. The control device (20) according to claim 1, wherein the alignment operation includes an operation of outputting a control command for causing a notification that urges a rider to change a lateral direction position of at least one of the own-vehicle (100) and the motorcycle (200) other than the own-vehicle (100) in the array.

3. The control device (20) according to claim 1, wherein the alignment operation includes an operation of outputting a control command for causing a notification that urges a rider to change a front-back direction position of at least one of the own-vehicle (100) and the motorcycle (200) other than the own-vehicle (100) in the array.

4. The control device (20) according to claim 1, wherein the alignment operation includes an operation of outputting a control command for changing a front-back direction position of at least one of the own-vehicle (100) and the motorcycle (200) other than the own-vehicle (100) in the array.

5. The control device (20) according to claim 4, wherein the alignment operation includes an operation of changing a setting value of the vehicle speed control operation that is executed in the motorcycle (200) of which a position is desired to be changed in accordance with the alignment operation.

6. The control device (20) according to claim 1, wherein the alignment operation execution section (23) executes the alignment operation, on the basis of positional relationship information between at least a first motorcycle that is the motorcycle (200) of which a position is desired to be changed in accordance with the alignment operation, a second motorcycle that is the motorcycle (200) different from the first motorcycle, and a third motorcycle that is the motorcycle (200) different from the first motorcycle and the second motorcycle.

7. The control device (20) according to claim 6, wherein the second motorcycle travels ahead of the first motorcycle, and the third motorcycle travels behind the first motorcycle.

8. The control device (20) according to claim 6, wherein the second motorcycle and the third motorcycle travel ahead of the first motorcycle.

9. The control device (20) according to claim 6, wherein the second motorcycle and the third motorcycle travel behind the first motorcycle.

10. The control device (20) according to claim 6, wherein the second motorcycle and the third motorcycle belong to the same line (L1, L2) of vehicles as that of the first motorcycle.

11. The control device (20) according to claim 6, wherein the second motorcycle and the third motorcycle belong to a line (L1, L2) of vehicles different from that of the first motorcycle.

12. The control device (20) according to claim 6, wherein one of the second motorcycle and the third motorcycle belongs to the same line (L1, L2) of vehicles as that of the first motorcycle, and the other of the second motorcycle and the third motorcycle belongs to a line (L1, L2) of vehicles different from that of the first motorcycle.

13. The control device (20) according to claim 6, wherein the alignment operation execution section (23) changes a vehicle to be selected as the second motorcycle and/or the third motorcycle, on the basis of arrangement information on the own-vehicle (100) in the array.

14. The control device (20) according to claim 1, wherein the alignment operation execution section (23) executes the alignment operation, on the basis of a driving stability of the motorcycle (200) of which a position is desired to be changed in accordance with the alignment operation.

15. A control method of a rider assistance system (1), wherein a control device (20) having an electronic processor executes a vehicle speed control operation of an own-vehicle (100), based on positional relationship information between the own-vehicle (100) and at least one preceding vehicle (300) that is acquired while the own-vehicle (100) is driving, the vehicle speed control operation including determining whether or not a group driving mode, which is a mode in which the at least three motorcycles (200) including the own-vehicle (100) perform group driving, is valid while the motorcycle (100) is driving; and the control device (20) executes an alignment operation of aligning at least a part of an array that is formed by at least three motorcycles (200) in the vehicle speed control operation in a state in which the group driving mode is valid, the alignment operation including an alignment operation of a lateral direction position.

* * * * *